US010495065B2

(12) United States Patent
Fortner

(10) Patent No.: US 10,495,065 B2
(45) Date of Patent: Dec. 3, 2019

(54) MULTI-TURBINE PLATFORM TOWER ASSEMBLY AND RELATED METHODS SYSTEMS, AND APPARATUS

(71) Applicant: William O. Fortner, Gillette, WY (US)

(72) Inventor: William O. Fortner, Gillette, WY (US)

(*) Notice: Subject to any disclaimer, the term of this patent is extended or adjusted under 35 U.S.C. 154(b) by 0 days.

(21) Appl. No.: 15/969,395

(22) Filed: May 2, 2018

(65) Prior Publication Data

US 2018/0320666 A1 Nov. 8, 2018

Related U.S. Application Data

(60) Provisional application No. 62/500,797, filed on May 3, 2017.

(51) Int. Cl.
*F03D 13/20* (2016.01)
*E04H 12/00* (2006.01)
*F03D 9/25* (2016.01)

(52) U.S. Cl.
CPC ............. *F03D 13/22* (2016.05); *E04H 12/00* (2013.01); *F03D 9/25* (2016.05); *F05B 2220/708* (2013.01); *F05B 2220/7064* (2013.01)

(58) Field of Classification Search
CPC . F03D 13/22; F03D 9/25; F03D 13/20; F03D 1/02; E04H 12/00; F05B 2220/7064; F05B 2220/708
See application file for complete search history.

(56) References Cited

U.S. PATENT DOCUMENTS

| | | | |
|---|---|---|---|
| 4,108,322 A * | 8/1978 | Kochanneck | E04H 6/287 414/263 |
| 4,266,143 A * | 5/1981 | Ng | F03B 13/20 290/42 |
| 6,666,650 B1 * | 12/2003 | Themel | B64C 11/48 416/200 R |
| 6,888,264 B1 * | 5/2005 | Willis | F03D 13/10 290/55 |
| 7,329,965 B2 * | 2/2008 | Roberts | F03D 3/061 290/55 |
| 7,453,168 B2 | 11/2008 | Lanie | |

(Continued)

FOREIGN PATENT DOCUMENTS

EP 2326834 B1 2/2010
WO 2010021585 A1 2/2010
(Continued)

*Primary Examiner* — Tulsidas C Patel
*Assistant Examiner* — Joseph Ortega
(74) *Attorney, Agent, or Firm* — Bretton L. Crockett; TechLaw Ventures, PLLC

(57) ABSTRACT

Platform tower assemblies for mounting wind turbine assemblies, as well as methods, systems and components related thereto. A central shaft may support a series of planar platforms along its length, each platform constructed to support a plurality of wind turbine assemblies. The wind turbine assemblies may be positioned to optimize production based on prevailing wind directions, and may include turbine assemblies optimized for different wind conditions. The platform tower may include a housing around a lower portion for storage of batteries and control circuitry. The uppermost platform may include one or more solar panels for additional power generation capability.

18 Claims, 2 Drawing Sheets

(56) References Cited

U.S. PATENT DOCUMENTS

| | | | | |
|---|---|---|---|---|
| 8,154,145 B2* | 4/2012 | Krauss | F03D 3/0409 | 290/54 |
| 8,240,977 B2* | 8/2012 | Gornatti | F03D 3/0409 | 415/4.2 |
| 8,358,030 B2* | 1/2013 | Plaskove | F03D 3/02 | 290/55 |
| 8,912,679 B2 | 12/2014 | Rodway | | |
| 9,038,385 B1* | 5/2015 | Khim | F03G 6/045 | 60/641.12 |
| 9,803,622 B2* | 10/2017 | Aranovich | F03D 3/04 | |
| 2003/0209911 A1* | 11/2003 | Pechler | F03D 3/0427 | 290/55 |
| 2005/0095092 A1* | 5/2005 | Segal | E04H 6/245 | 414/263 |
| 2006/0138782 A1* | 6/2006 | Friesth | F03D 1/025 | 290/55 |
| 2008/0093861 A1* | 4/2008 | Friesth | F03D 1/025 | 290/55 |
| 2009/0202346 A1* | 8/2009 | Baron | F03D 3/068 | 416/9 |
| 2010/0109337 A1* | 5/2010 | Wang | F03D 3/067 | 290/55 |
| 2010/0138201 A1 | 6/2010 | Gundling | | |
| 2010/0150718 A1* | 6/2010 | Freda | B60L 8/006 | 416/120 |
| 2010/0181779 A1* | 7/2010 | Elliott | F03D 3/02 | 290/55 |
| 2011/0006534 A1* | 1/2011 | Achard | F03B 17/063 | 290/54 |
| 2011/0156392 A1* | 6/2011 | Thacker, II | F03D 3/0472 | 290/44 |
| 2011/0181047 A1* | 7/2011 | Dulcetti Filho | F03D 3/02 | 290/55 |
| 2011/0206526 A1* | 8/2011 | Roberts | F03D 3/02 | 416/223 R |
| 2012/0051939 A1* | 3/2012 | Marvin | F03D 1/04 | 416/244 R |
| 2012/0124985 A1* | 5/2012 | Lei | F03D 3/005 | 60/398 |
| 2013/0106105 A1* | 5/2013 | Dehlsen | F03B 17/061 | 290/43 |
| 2013/0294918 A1* | 11/2013 | Jaquier | F03B 13/10 | 416/179 |
| 2014/0050586 A1* | 2/2014 | Chio | F03D 3/0427 | 416/182 |
| 2014/0083027 A1* | 3/2014 | Haisam | F03D 9/255 | 52/173.1 |
| 2014/0097082 A1 | 4/2014 | Oroza | | |
| 2014/0105752 A1* | 4/2014 | Andrews | F03B 13/264 | 416/241 R |
| 2014/0375061 A1 | 12/2014 | Hossain et al. | | |
| 2015/0048619 A1* | 2/2015 | Lin | F03B 13/264 | 290/54 |
| 2015/0069759 A1* | 3/2015 | Aranovich | F03D 3/04 | 290/52 |
| 2015/0192107 A1* | 7/2015 | Kirchman | F03D 7/06 | 416/1 |
| 2015/0219066 A1* | 8/2015 | Solheim | E02B 9/08 | 290/53 |
| 2016/0084222 A1* | 3/2016 | Chio | F03D 3/064 | 416/244 R |
| 2016/0097372 A1* | 4/2016 | Monaco | F03D 3/02 | 416/143 |
| 2016/0169192 A1* | 6/2016 | Aranzadi De Miguel | E04H 12/12 | 52/30 |
| 2016/0348387 A1* | 12/2016 | Geiger | E04B 1/34807 | |
| 2017/0051720 A1* | 2/2017 | Grigg | F03D 3/005 | |
| 2017/0096985 A1* | 4/2017 | Bardia | F03D 9/007 | |
| 2017/0175711 A1* | 6/2017 | Burkle | F03D 7/06 | |
| 2017/0234291 A1* | 8/2017 | Noia | H02K 7/06 | 290/53 |
| 2017/0241408 A1* | 8/2017 | Von Heland | F03D 7/0204 | |
| 2017/0284507 A1* | 10/2017 | Drew | F16H 1/46 | |
| 2017/0300051 A1* | 10/2017 | Zhou | G01S 19/14 | |
| 2018/0017042 A1* | 1/2018 | Baun | F03D 7/0224 | |
| 2018/0119669 A1* | 5/2018 | Dehlsen | F03B 13/264 | |
| 2018/0283350 A1* | 10/2018 | Farrant | F03D 5/02 | |
| 2018/0291873 A1* | 10/2018 | Sauer, Jr. | F03D 7/0248 | |
| 2018/0291874 A1* | 10/2018 | Sauer, Jr. | F03D 7/0248 | |
| 2019/0128241 A1* | 5/2019 | Achard | F03D 9/007 | |

FOREIGN PATENT DOCUMENTS

| | | |
|---|---|---|
| WO | 2010098813 A1 | 9/2010 |
| WO | 2015035262 A1 | 3/2015 |
| WO | 2016128004 A1 | 8/2016 |

* cited by examiner

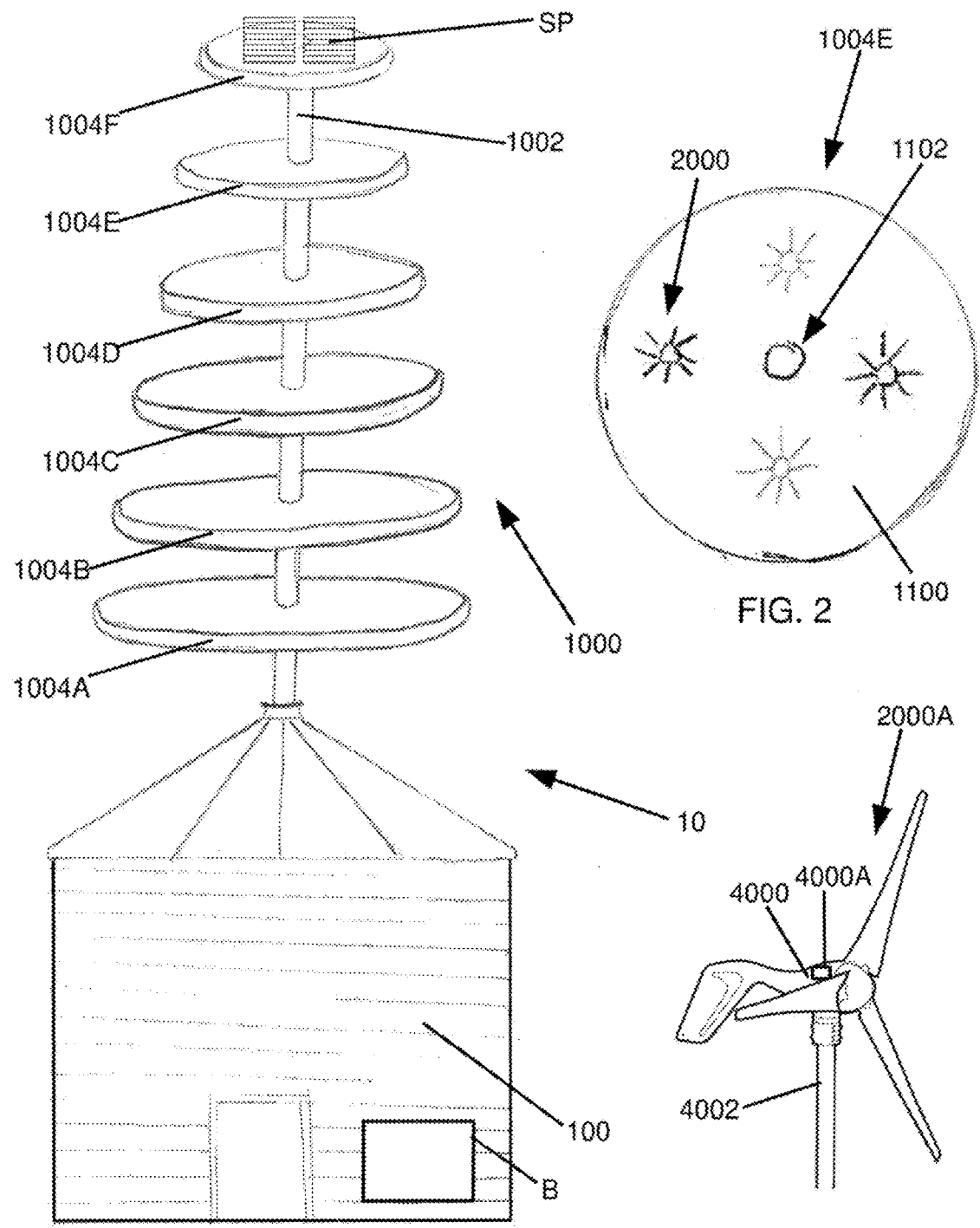

MULTI-TURBINE PLATFORM TOWER ASSEMBLY AND RELATED METHODS SYSTEMS, AND APPARATUS

CROSS-REFERENCE TO RELATED APPLICATION

This application claims the benefit of U.S. Provisional Application No. 62/500,797, filed May 3, 2017, the disclosure of which is incorporated herein by reference in its entirety.

TECHNICAL FIELD

The present disclosure relates to systems and methods for mounting wind power turbines.

BACKGROUND

A number of different mounting systems for windmills and wind powered turbines for electrical generation have been tried over the years. However, most of these have either been a single tower or pole with a single windmill head for residential or agricultural use, or are part of large commercial installations, used for generating power on a large scale.

A platform tower that allowed for the mounting of multiple wind powered turbine heads at a single installation would be an improvement in the art. Such an installation that was able to utilize multiple turbine heads for optimal output over different wind conditions at a single location would be a further improvement in the art.

SUMMARY

The present disclosure includes a platform tower assembly for mounting wind turbine assemblies, as well as methods, systems and components related thereto. A central shaft may support a series of planar platforms along its length, each platform constructed to support a plurality of wind turbine assemblies. The wind turbine assemblies may be positioned to optimize production based on prevailing wind directions, and may include turbine assemblies optimized for different wind conditions. The platform tower may include a housing around a lower portion for storage of batteries and control circuitry. The uppermost platform may include one or more solar panels for additional power generation capability.

DESCRIPTION OF THE DRAWINGS

It will be appreciated by those of ordinary skill in the art that the various drawings are for illustrative purposes only. The nature of the present disclosure, as well as other embodiments of the present invention, may be more clearly understood by reference to the following detailed description, to the appended claims, and to the several drawings.

FIG. 1 is a perspective front side view of a platform tower assembly for mounting wind turbines system in accordance with one aspect of the present disclosure.

FIGS. 2 and 3 are top views of two different platforms of the tower assembly of FIG. 1.

FIG. 4 is a schematic view of a wind turbine useful with the tower assembly of FIG. 1.

DETAILED DESCRIPTION

Figure 3:
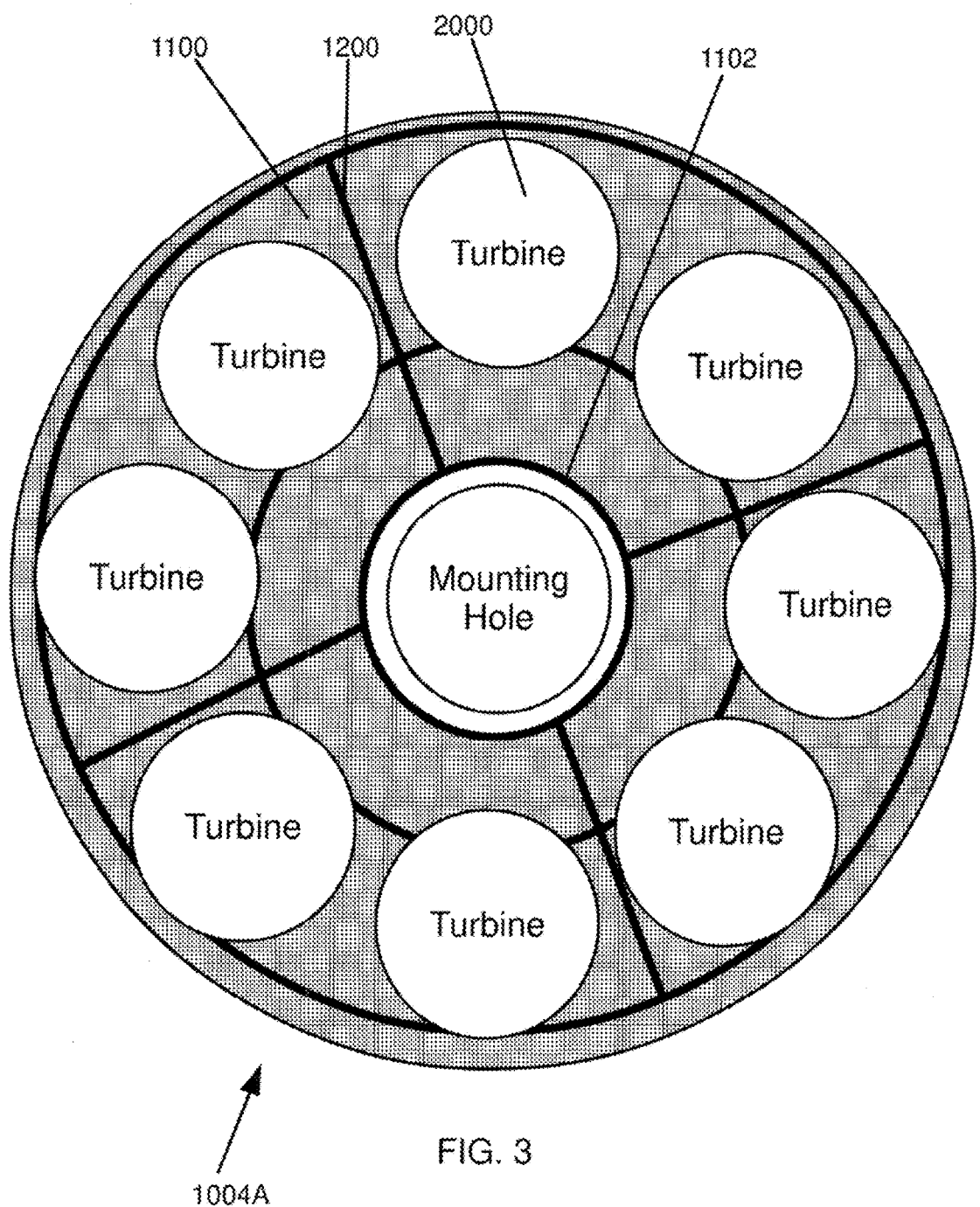

The present disclosure relates to apparatus, systems and methods for supporting and positioning wind turbines. It will be appreciated by those skilled in the art that the embodiments herein described, while illustrating certain embodiments, are not intended to so limit the disclosure or the scope of the invention. Those skilled in the art will also understand that various combinations or modifications of the embodiments presented herein can be made without departing from the scope of this disclosure. All such alternate embodiments are within the scope of the present invention.

Referring to FIG. 1, a first illustrative embodiment of a platform tower assembly 10 in accordance with the principles of the present disclosure is depicted. A central support shaft 1002 rises from a lower end to a top end. In some embodiments, the central support shaft 1002 may be a pipe or conduit of sufficient strength to support the tower assembly 10 and attachments, while providing a channel for placement of wiring in a central bore. In other embodiments, it may be a solid member to which conduit may be attached for wiring. The lower end may be secured in a suitable fashion. For example, the lower end of the central shaft 1002 may be set in, or attached to, a suitable foundation for supporting the tower assembly 10, including accounting for the forces generated by wind on the assembly.

Along an upper portion of the assembly 10, a series of planar platforms 1004A, et seq. are disposed along the vertical length of the central shaft 1002. In the depicted embodiment, there are six platforms from lower platform 1004A to top platform 1004F. Each platform must be vertically disposed from the other platforms at a sufficient distance to allow wind turbines disposed thereon to operate safely. It will be appreciated that the number of platforms may vary for a particular installation. For example, some installations may have only two platforms, where it will support a sufficient number of turbines for the location and its wind conditions. As depicted, the platforms 1004A to 1004F in the vertical array decrease in size, as by having a smaller diameter than platform spaced below it.

It will be appreciated that for large installations, the bore of the central support shaft 1002 may contain a ladder and openings at each platform 1004 to allow a worker to climb therein and access the platforms therefrom.

FIG. 2 is a top view of upper platform 1004E and FIG. 3 is a top schematic view of lower platform 1004A. As depicted, each platform 1004 may have a circular shape and has a planar upper surface or deck 1100. The platforms 1004 may be constructed using a suitable support frame which has a decking material, such as a sheet metal disposed thereover. In some embodiments, the decking may be expanded metal (a depicted in FIG. 4), which provides a surface for workers during installation and repairs, but allows wind to pass therethrough and reduces the weight of the platforms.

Each platform 1004 has a central hole 1102 through which the central shaft 1002 passes, upon installation. It will be appreciated that the platforms 1004 may be attached to the central shaft 1002 in any suitable fashion to provide proper securing. For example, the frame 1200 (FIG. 3) of the platform 1004 may formed of suitable metal members welded to one another and to the central shaft 1002 or secured thereto with suitable fittings, and the central shaft 1002 may include suitable fittings or counterpart receivers for the platform fittings.

Each platform 1004 is constructed to support a plurality of wind turbine assemblies 2000. The number of turbine assemblies 2000 may vary based on the particular platform. For example, a smaller platform, such as platform 1004E may be sized and adapted for up to four turbines and a larger one, such as that depicted at 1004A may be constructed for the installation of up to eight turbines. It will be appreciated that not all turbines 2000 that a platform may support will need to be installed, allowing users to add additional capacity later or more flexibility in design.

The wind turbine assemblies 2000 may be positioned to optimize production based on prevailing wind directions, and may include turbine assemblies optimized for different wind conditions. FIG. 4 depicts one suitable wind turbine assembly 2000A, which includes a traditional windmill head 4000 swivel mounted on a short pole 4002, allowing it to rotate into the wind. Such assemblies may be mounted on the platforms 1004, as by attachment of the pole 4002 to the platform 1400 frame 1200. The depicted head is a battery charging wind turbine sold by Primus Wind Power, Inc. of Lakewood, Colo. under the name AIR. These include the AIR 30, which operates at wind speeds at from about 8 to about 110 mph and the AIR 40, which operates at speeds of from about 7 to about 110 mph. Other suitable turbines include those from WindBlue Power, LLC of Stroh, Ind. which offers similar wind generators and kits under its BREEZE line of products. These include a higher speed product, the BREEZE, which operates at about 10 mph or higher wind speeds and the LITE BREEZE which operates at lower wind speeds, including about 6 mph.

Such turbines may use automotive alternators (graphically indicated by box 4000A) that are turned by the windmill rotors to generate electricity suitable for charging 12 volt batteries, or similar electrical generating devices. The average winds in most portions of the country are less than 20 mph. By using a mixture of low and high wind speed turbines, placed to capture the prevailing winds in a location, assemblies in accordance with the present invention allows for the generation of electricity for residential or small scale use by wind power at locations, where this was not previously feasible. In one illustrative embodiment, a set of "low speed" turbines that generating power in a range peaking at wind speeds of about 5 to 10 mph or less and a set of "high speed" turbines that generate power in a range peaking at wind speeds in excess of about 15 mph or more may be used.

For example, the placement of each turbine on a particular platform for elevation, and the particular location on each platform allows for the turbines to be placed to capture wind from prevailing or common direction, or from any direction, and, to most efficiently use a combination of high and low windspeed turbines to obtain consistent generation.

It will be appreciated that other suitable turbines 2000 may be used, including vertically arrayed turbines that rotate around a central vertical axis. One example of a vertically axis wind turbine is set forth in U.S. Pat. No. 9,803,622 to Vert Nova, LLC which issued Oct. 31, 2017, and is expressly incorporated by reference herein in its entirety. The topmost platform may further include one or more solar panels SP that are installed at a suitable angle for photovoltaic power generation, allowing the assembly 10 to support multiple types of generation The platform tower assembly 10 may include a housing 100 around a lower portion thereof. In the depicted embodiment, this may be formed as a small building or shed, allowing for storage of batteries (graphically indicated by box B) and control circuitry.

While this disclosure has been described using certain embodiments, the present disclosure can be further modified while keeping within its spirit and scope. This application is therefore intended to cover any variations, uses, or adaptations of the disclosure using its general principles. Further, this application is intended to cover such departures from the present disclosure as come within known or customary practices in the art to which this invention pertains and which fall within the limits of the appended claims.

What is claimed is:

1. A platform assembly for generating electricity, comprising:
    a central support shaft;
    a plurality of platforms disposed on the central support shaft spaced vertically apart from one another, each platform of the plurality of platforms having a generally planar deck and each platform of the plurality having a larger surface area than the platform spaced immediately above it on the central support shaft;
    a plurality of electric generating wind turbines disposed at different locations on at least one platform of the plurality of platforms.

2. The platform assembly of claim 1, wherein the central support shaft comprises a hollow conduit.

3. The platform assembly of claim 1, wherein each platform of the plurality of platforms has an electric generating mechanism disposed thereon.

4. The platform assembly of claim 3, wherein the uppermost platform has at least one solar panel assembly disposed thereon.

5. The platform assembly of claim 1, wherein each platform of the plurality of platforms has a generally circular shape.

6. The platform assembly of claim 1, wherein each platform of the plurality of platforms has a supporting framework that is covered by a decking material.

7. The platform assembly of claim 6, wherein the decking material is expanded metal.

8. The platform assembly of claim 1, wherein the plurality of electric generating wind turbines comprises at least one wind turbine which operates to generate electricity in a range peaking at a wind speed of less than about 10 mph and at least a second wind turbine which operates to generate electricity in a range peaking at a wind speed of greater than about 20 mph.

9. The platform assembly of claim 1, wherein the plurality of electric generating wind turbines comprises turbines that use vanes to rotate an alternator to generate a 12 volt electric current.

10. The platform assembly of claim 1, wherein the plurality of electric generating wind turbines comprises at least one turbine disposed for rotation around a vertical axis.

11. The platform assembly of claim 1, further comprising a housing disposed around the central shaft at a lower portion thereof and a set of batteries disposed in the housing for storing electricity generated by the plurality of wind turbines.

12. An assembly for generating electricity, comprising:
    a central support shaft;
    a plurality of generally planar platforms disposed on the central support shaft spaced vertically apart from one another, each generally planar platform of the plurality of generally planar platforms having a larger surface area than the platform spaced immediately above it on the central support shaft;
    at least one wind turbine which operates to generate electricity in a range peaking at a wind speed of less than about 10 mph disposed at a first position on at least one platform of the plurality of generally planar platforms; and
    at least a second wind turbine which operates to generate electricity in a range peaking at a wind speed of greater than about 20 mph disposed on the at least one platform of the plurality of generally planar platforms.

13. The assembly of claim 12, further comprising a first plurality of electric generating wind turbines which operate to generate electricity in a range peaking at a wind speed of less than about 10 mph disposed on the at least one platform and a second plurality of electric generating wind turbines which operate to generate electricity in a range peaking at a wind speed of greater than about 20 mph disposed on the at least one platform.

14. The assembly of claim 12, wherein each platform of the plurality of generally planar platforms has an electric generating mechanism disposed thereon.

15. The assembly of claim 14, wherein the uppermost platform has at least one solar panel assembly disposed thereon.

16. The assembly of claim 12, wherein the at least one platform has a generally circular shape.

17. The platform assembly of claim 12, wherein the at least one electric generating wind turbine comprises a windmill style turbine that uses vanes to rotate an alternator to generate a 12 volt electric current.

18. The platform assembly of claim 17, wherein the at least one wind turbine comprises a wind turbine disposed for rotation around a vertical axis.

\* \* \* \* \*